(12) United States Patent
Delhorme et al.

(10) Patent No.: US 6,689,241 B1
(45) Date of Patent: Feb. 10, 2004

(54) SEALED VACUUM DOUBLE GLAZING AND METHOD FOR MAKING

(75) Inventors: David Delhorme, Cambronne les Ribecourt (FR); Rene Poix, Noyon (FR); Yves Demars, Clermont (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 09/601,334

(22) PCT Filed: Dec. 9, 1999

(86) PCT No.: PCT/FR99/03080

§ 371 (c)(1),
(2), (4) Date: Nov. 6, 2000

(87) PCT Pub. No.: WO00/34614

PCT Pub. Date: Jun. 15, 2000

(30) Foreign Application Priority Data

Dec. 10, 1998 (FR) .............................. 98 15574

(51) Int. Cl.[7] .............................................. C03C 27/06
(52) U.S. Cl. .................. 156/109; 156/104; 156/286; 428/34; 52/786.1; 52/786.13
(58) Field of Search ................. 156/109, 104–105, 156/107, 285–286, 290–291, 292; 428/34; 52/204.593, 786.1, 786.13

(56) References Cited

U.S. PATENT DOCUMENTS

| 4,997,354 | A | * | 3/1991 | Delbeck et al. | ............. | 118/308 |
| 5,124,185 | A | * | 6/1992 | Kerr et al. | .................. | 428/120 |
| 6,059,909 | A | * | 5/2000 | Hartig et al. | ................ | 156/109 |
| 6,103,324 | A | * | 8/2000 | Collins et al. | ............... | 156/107 |
| 6,126,063 | A | * | 10/2000 | Vongfuangfoo et al. | .... | 228/246 |
| 6,143,374 | A | * | 11/2000 | Cairncross et al. | .......... | 427/180 |
| 6,261,652 | B1 | * | 7/2001 | Poix et al. | .................. | 428/120 |

FOREIGN PATENT DOCUMENTS

| FR | WO 98/04802 | * | 2/1998 | ........... E06B/3/663 |
| JP | 6-333930 | * | 12/1994 | ......... H01L/21/321 |

* cited by examiner

*Primary Examiner*—Jeff H. Aftergut
*Assistant Examiner*—Jessica Rossi
(74) *Attorney, Agent, or Firm*—Oblon, Spivak, McClelland, Maier & Neustadt, P.C.

(57) ABSTRACT

The invention relates to vacuum insulating glazing consisting of two glass sheets held apart by spacers and a peripheral seal.

The invention also relates to a process for producing such vacuum insulating glazing.

10 Claims, 2 Drawing Sheets

SEALED VACUUM DOUBLE GLAZING AND METHOD FOR MAKING

BACKGROUND OF THE INVENTION

1. Field of the Invention

The invention relates to vacuum insulating glazing consisting of two sheets of glass held apart by spacers and a peripheral seal.

The invention also relates to a process for producing such vacuum insulating glazing.

2. Discussion of the Background

To obtain thermal and/or acoustic insulation, it is usual to produce insulating glazing comprising two sheets of glass separated from each other by a relatively trick layer of air. Such glazing provides thermal insulation regarded as being insufficient for some applications. To remedy this, it is known to produce glazing which comprises three sheets of glass and one of the air layers may be replaced with a gas, for example krypton. Such glazing has markedly improved thermal insulation properties but its thickness is such that it is not always easy to use.

Moreover, the current demand by users is to move towards glazing thermal insulation equivalent to that of solid partitions, that is to say walls.

Insulating glazing has already been proposed, for instance in patent WO 91/02878, which consists of two sheets of glass separated from each other by a space in which a vacuum has been created.

Because of the vacuum, such glazing provides very good insulation, but it is very difficult to produce. Firstly, the small thickness between the two sheets of glass, which is a few tenths of a millimeter, must be constant over the entire area where the sheets of glass face each other. Secondly, the two sheets of glass must be sealed so as to be perfectly tight.

Patent WO 91/02878 describes a technique consisting in placing mounts a few tenths of a millimeter in thickness on one of the sheets of glass, distributed over the entire surface, and at the same time a seal which will allow the two sheets to be sealed. These studs and this seal are produced from the same material, which is a glass composition. It will be apparent that this glazing is difficult to produce because of these simultaneous steps which require tricky operations.

Patent Application FOR 96/09632 describes a process for creating a vacuum between two sheets of glass which may form insulating glazing. According to that process, the spacers are adhesively bonded by successively depositing amounts of an inorganic bonding compound, for example by screen printing, followed by spacers using a suction tool pierced with holes, smaller than the said spacers, with the same pitch as the mounts obtained. The spacers according to that process have a bitruncated spherical shape with parallel faces. Such a process requires a complicated apparatus and high precision in the operations.

The objective of the invention is to provide a process, which is simple to carry out, for producing vacuum insulating glazing, and the glazing produced.

This objective is achieved according to the invention by a process for producing vacuum insulating glazing, consisting of two sheets of glass held apart by spacers and a peripheral seal, which process consists, after the spacers have been deposited between the two sheets of glass, in sealing around the periphery and in creating a vacuum. The said process is such that spots of adhesive with a diameter less than or equal to the diameter of the spacers are deposited on one of the sheets of glass, the spacers are made to roll over the said sheet of glass so that only a single spacer adheres to each spot of adhesive and the second sheet of glass is deposited on the spacers and the peripheral seal.

According to a preferred embodiment of the invention, spherical spacers are made to roll. In this way, the shape of the spacer does not impose conditions on the deposition itself.

According to one advantageous embodiment of the invention, the sheet of glass is inclined by at least 1° during the step of depositing the spacers. Thus, the inclination allows the spacers to encounter the spots of adhesive and also allows the spacers to be removed from the sheet by rolling when they have not encountered a spot of adhesive.

According to a preferred embodiment of the invention, the spots of adhesive are deposited by screen printing.

Advantageously, the spots of adhesive are spots of enamel.

According to a preferred embodiment of the invention, the spacers are compressed slightly during the phase of creating the vacuum.

The invention also provides vacuum insulating glazing that can especially be produced using the process described above.

According to the invention, the vacuum insulating glazing consists of two glass sheets held apart by spacers and a peripheral seal, the said spacers being metal balls bonded to only one sheet of glass by means of spots of adhesive and the said spots of adhesive having a diameter less than or equal to the diameter of the spacers so as to bond only a single spacer each time.

According to a preferred embodiment of the invention, the spacers have a diameter $d_1$ of between 0.2 and 0.6 mm and the diameter $d_2$ of the spots of adhesive is equal to $(d_1 - 0.1 \text{ mm})$.

According to one advantageous embodiment of the invention, the spacers are slightly compressed between the two sheets of glass so as to have distributed contact areas matching the deformation of the glass.

Preferably, the adhesive is an inorganic compound and advantageously an enamel with a medium hardening by drying or curing.

According to a preferred embodiment of the invention, the metal spacer has a Young's modulus less than or equal to 250 GPa and a yield stress less than or equal to 520 Mpa.

According to an advantageous embodiment of the invention, the spacer is made of stainless steel.

BRIEF DESCRIPTION OF THE DRAWINGS

Further details and advantageous characteristics of the invention will emerge below from the description of an illustrative embodiment according to the invention, given with reference to the figures which show.

DESCRIPTION OF THE PREFERRED EMBODIMENTS

It should firstly be pointed out that, for the sake of clarity, all the figures do not strictly respect the proportions between the various elements shown.

Figure 1:
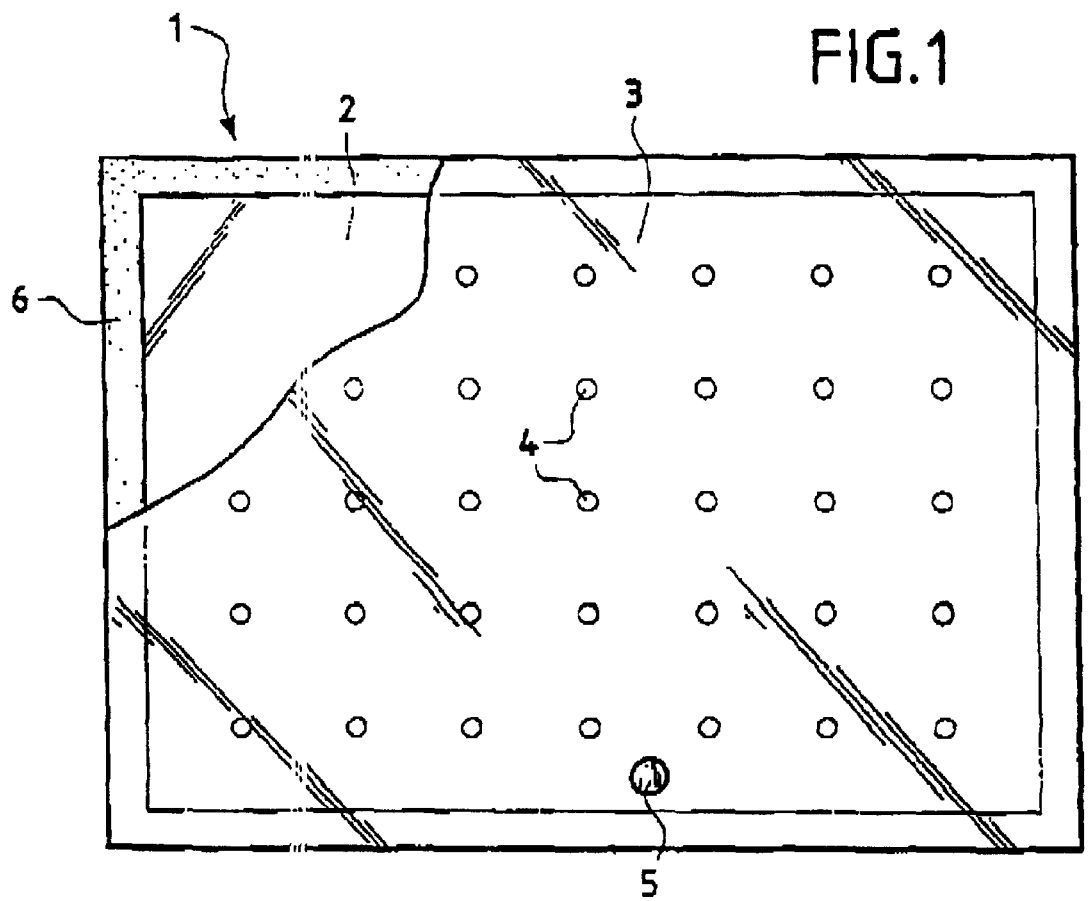
FIG. 1: a top view of vacuum insulating glazing according to the invention.

FIG. 1 shows a top view of a diagram of vacuum insulating glazing 1. This is composed of two sheets of glass 2 and 3 held a certain distance apart by spacers 4 which can be seen in FIG. 1 as if they were transparent. The sheets of glass have a thickness of 4 mm and are subjected beforehand to a thermal toughening treatment for the purpose of enhancing their mechanical properties so that they are able to withstand the stresses that are exerted when the vacuum is being created.

It may be seen in FIG. 1 that these spacers 4 are distributed over the entire surface of the glazing in a uniform manner. They are separated from each other by a distance of 30 millimeters. This distribution of the spacers 4 makes it possible to maintain a space between the sheets of glass 2 and 3. The number, size and distribution of the spacers are determined in order to guarantee that the glazing has good strength and to prevent any risk of contact between the sheets of glass 2 and 3 and so as not to create too great a thermal bridge and not to disturb the transmission of light.

Moreover, the spacers 4 are produced from stainless steel, in the form of balls 0.3 mm in diameter. The spacers thus have various properties necessary for their use, most particularly a low thermal conductivity which avoids the creation of a thermal bridge between the two sheets of glass 2 and 3. They also have a good compressive strength, with a Young's modulus of 250 GPa and a yield stress of 517 MPa, and good toughness, ensuring good behaviour of the glazing while the vacuum is being created and when it is being used.

FIG. 1 also shows the disc 5 which plugs the hole that has served for creating the vacuum in the glazing 1. This disc is made of copper. It may be positioned anywhere on the glazing and preferably on one edge, for the sake of discretion. Also preferably, it is located at the center of a long side of the glazing, as shown in FIG. 1; this is advantageous when creating the vacuum since such a position makes it possible in particular to reduce as much as possible the pumping time for a given vacuum. Of course, the invention is not limited to this type of production and any other means of definitively sealing the glazing falls within the scope of the invention.

FIG. 1 also shows the seal 6. This is made of an enamel paste, the temperature of firing of which, in order to remove the organic components, is about 450° C. This temperature makes it possible in particular to prevent relaxation of the toughening stresses which occurs only at higher temperatures. During production of the glazing 1, the seal 6 is deposited with a width of between 1 and 4 mm and a thickness of approximately 1.5 mm. This thickness is reduced, by pressing during the firing phase, to 0.2 mm between the two sheets of glass so as to be identical to the thickness of the spacers 4 then the latter are slightly compressed between the two sheets of glass 2 and 3, the width of the seal then being at least 10 mm.

Figure 2A:
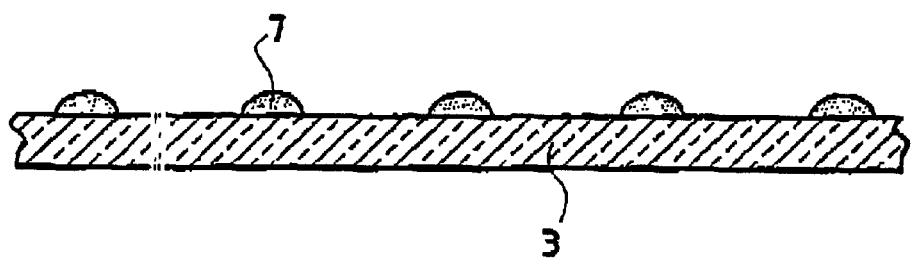
FIGS. 2a, 2b and 2c: diagrams illustrating the successive steps of the process according to the invention.
Figure 2B:
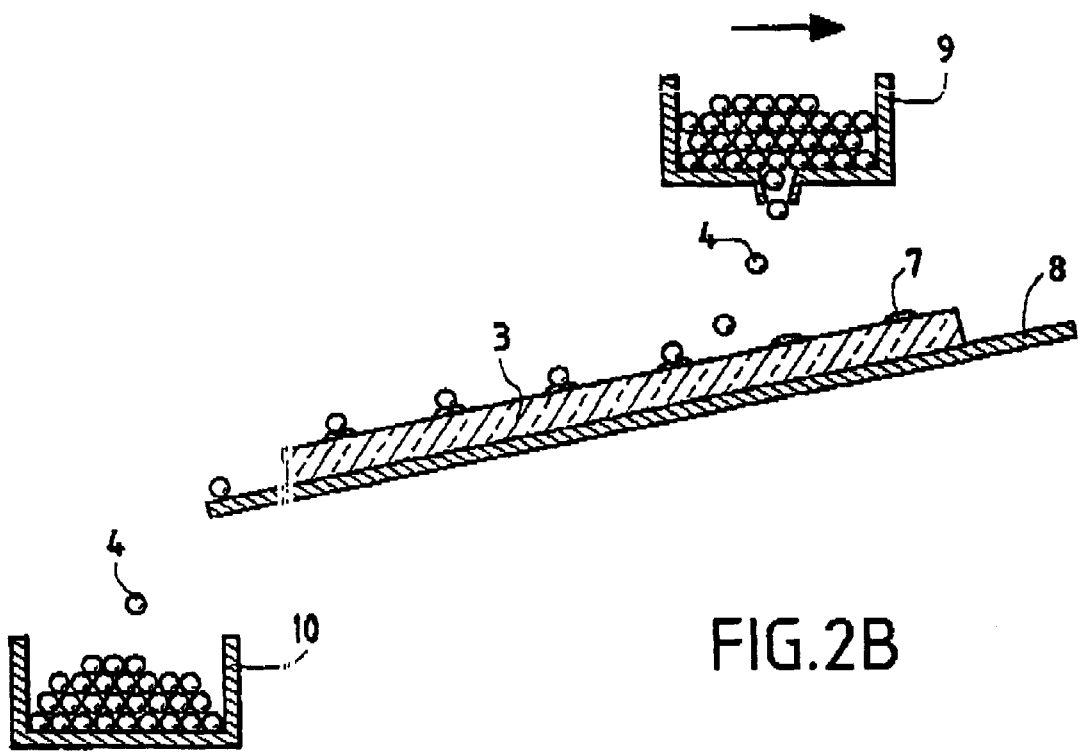
Figure 2C:
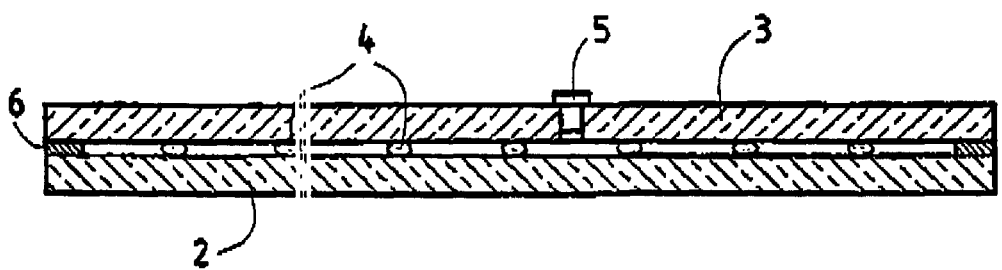

FIG. 2a, 2b and 2c illustrate, in particular, the successive steps of the production process according to the invention.

In FIG. 2a, spots of bonding enamel 7 have been deposited on one sheet of glass 3. These spots 7 have, for example, been deposited by screen printing using a silk screen. These spots 7 are thus arranged precisely, with a pitch of 30 mm and a diameter of 0.2 mm.

FIG. 2b then shows the step of depositing the spacers by making them roll. The sheet of glass 3 is placed on a 2° inclined plane 8. The spacers 4 are placed in a dusting device 9 which moves above the sheet of glass 3, starting from the lowest part. Thus, deposition from the bottom up makes it possible to prevent the spacers from picking up speed and thus being poorly positioned on the spots of enamel 7 or carrying away enamel to other parts of the sheet of glass 3. The spacers 4 that have not encountered a spot of enamel 7 are collected in a tray 10 and reused.

In FIG. 2c, the second sheet of glass 2 has been deposited on the spacers 4 and on the seal 6, the spots of bonding enamel 7 having a viscosity high enough to keep the spacers in place. The fact that the spacers 4 are not bonded to the sheet of glass 2 makes it easier in particular for it to be positioned. In addition, the a absence of this bonding may avoid the risk of breakage when the glazing 1 is in use if the two sheets if glass do not undergo exactly the same expansion.

After the firing operation, during which both the peripheral sealing enamel 6 and the bonding enamel 7 are fired, it is possible to carry out the vacuum operation via the hole 11 provided for this purpose, and then to plug the hole 11 using the disc 5 by any means known to those skilled in the art such as, for example, by the process described in patent application Ser. No. 96/09632 filed in the name or Saint-Gobain Vitrage.

Once the vacuum has been created in the glazing 1, the spacers 4 are slightly compressed between the two sheets of glass 2 and 3 so as to have distributed contact areas.

What is claimed is:

1. Process for producing vacuum insulating glazing, including first and second sheets of glass held apart by spacers and a peripheral seal, the process comprising:
    depositing spots of adhesive with a diameter less than or equal to a diameter of the spacers on the first sheet of glass;
    inclining the first sheet of glass by at least 1°;
    depositing the spacers on the inclined first sheet of glass from a lower portion of the first sheet of glass to an upper portion of the first sheet of glass;
    rolling the spacers over the first sheet of glass so that only a single spacer adheres to each spot of adhesive;
    depositing the second sheet of glass on the spacers and the peripheral seal and
    creating a vacuum between the first and second sheets of glass.

2. Process for producing vacuum insulating glazing according to claim 1, characterized in that the spacers are compressed slightly during the creating of the vacuum.

3. Process for producing vacuum insulating glazing according to claim 1, wherein the spacers have a diameter $d_1$ between 0.2 and 0.6 mm, and the spots of adhesive have a diameter equal to $(d_1-0.1 \text{ mm})$.

4. Process for producing vacuum insulating glazing according to claim 1, characterized in that the spots of adhesive are deposited by screen printing.

5. Process for producing vacuum insulating glazing according to claim 4, characterized in that the spots of adhesive are spots of enamel.

6. Process for producing vacuum insulating glazing according to claim 1, wherein the spots of adhesive comprise an inorganic compound.

7. Process for producing vacuum insulating glazing according to claim 6, wherein the inorganic compound comprise an enamel with a medium hardening by one of drying and curing.

8. Process for producing vacuum insulating glazing according to claim 1, wherein the spacers comprise a metal.

9. Process for producing vacuum insulating glazing according to claim 8, wherein the metal comprises at least one of a Young's modulus less than or equal to 250 GPa and a yield stress less than or equal to 520 MPa.

10. Process for producing vacuum insulating glazing according to claim 8, wherein the metal comprises stainless steel.

* * * * *

UNITED STATES PATENT AND TRADEMARK OFFICE
CERTIFICATE OF CORRECTION

PATENT NO. : 6,689,241 B1  Page 1 of 1
DATED : February 10, 2004
INVENTOR(S) : Delhorme et al.

It is certified that error appears in the above-identified patent and that said Letters Patent is hereby corrected as shown below:

Title page, Item [54] and Column 1, lines 1-2,
Title, should read -- SEALED VACUUM DOUBLE GLAZING AND METHOD FOR MAKING SAME --

Signed and Sealed this

Twenty-seventh Day of April, 2004

JON W. DUDAS
*Acting Director of the United States Patent and Trademark Office*